US012749802B2

(12) United States Patent
Shi et al.

(10) Patent No.: US 12,749,802 B2
(45) Date of Patent: Sep. 29, 2026

(54) SIGNAL ENHANCEMENT APPARATUS FOR MOWER, AND MOWER

(71) Applicants: SUZHOU CLEVA PRECISION MACHINERY & TECHNOLOGY CO., LTD, Suzhou (CN); SKYBEST ELECTRIC APPLIANCE (SUZHOU) CO., LTD., Suzhou (CN)

(72) Inventors: Tao Shi, Suzhou (CN); Chen Zhang, Suzhou (CN)

(73) Assignees: Suzhou Cleva Precision Machinery & Technology Co., Ltd., Suzhou (CN); Skybest Electric Appliance (Suzhou) Co., Ltd., Suzhou (CN)

( * ) Notice: Subject to any disclaimer, the term of this patent is extended or adjusted under 35 U.S.C. 154(b) by 145 days.

(21) Appl. No.: 18/721,375

(22) PCT Filed: Dec. 31, 2021

(86) PCT No.: PCT/CN2021/143799

§ 371 (c)(1),
(2) Date: Jun. 18, 2024

(87) PCT Pub. No.: WO2023/115640

PCT Pub. Date: Jun. 29, 2023

(65) Prior Publication Data

US 2025/0062523 A1 Feb. 20, 2025

(30) Foreign Application Priority Data

Dec. 23, 2021 (CN) ........................ 202123271908.0

(51) Int. Cl.
*H01Q 15/14* (2006.01)
*A01D 34/00* (2006.01)
*H01Q 1/27* (2006.01)

(52) U.S. Cl.
CPC ............... *H01Q 1/27* (2013.01); *H01Q 15/14* (2013.01)

(58) Field of Classification Search
CPC ........ A01D 34/00; A01D 34/008; H01Q 1/22; H01Q 1/27; H01Q 1/36; H01Q 1/50; H01Q 15/14; H01Q 19/10
See application file for complete search history.

(56) References Cited

U.S. PATENT DOCUMENTS 5,307,075 A * 4/1994 Huynh ................ H01Q 9/0414 343/846
6,054,953 A * 4/2000 Lindmark ........... H01Q 9/0407 343/846
(Continued)

FOREIGN PATENT DOCUMENTS

CN 1797852 A 7/2006
CN 202395139 U 8/2012
(Continued)

OTHER PUBLICATIONS

International Search Report for application No. PCT/CN2021/143799, dated Sep. 21, 2022.

*Primary Examiner* — Tho G Phan
(74) *Attorney, Agent, or Firm* — JK Intellectual Property Law, PA

(57) ABSTRACT

A signal enhancement apparatus configured to be mounted in a mounting base of a lawn mower the signal enhancement apparatus for a lawn mower includes an antenna box, and a signal enhancement plate configured for attachment to the mounting base. The antenna box is arranged on the signal enhancement plate. The signal enhancement plate includes a dielectric layer and a reflection layer, with the reflection layer being provided on at least one side of the dielectric layer. An area of the reflection layer is not less than an orthographic projection area of the antenna box on the signal
(Continued)

enhancement plate. The orthographic projection area of the antenna box on the enhancement plate is configured to be within the area of the reflection layer. A related mower is also disclosed.

16 Claims, 3 Drawing Sheets

(56) References Cited

U.S. PATENT DOCUMENTS

| | | | | |
|---|---|---|---|---|
| 6,222,488 | B1 | 4/2001 | Pai-Chauan et al. | |
| 9,237,689 | B2 * | 1/2016 | Choi | A01D 34/008 |
| 10,490,905 | B2 * | 11/2019 | Izadian | H01Q 21/0087 |
| 12,005,787 | B2 * | 6/2024 | Kiyooka | G06T 7/0002 |
| 12,388,167 | B2 * | 8/2025 | Jing | H01Q 1/246 |
| 12,396,386 | B2 * | 8/2025 | McCutcheon, IV | F21S 43/14 |

FOREIGN PATENT DOCUMENTS

| | | | |
|---|---|---|---|
| CN | 202839966 | U | 3/2013 |
| CN | 204927519 | U | 12/2015 |
| CN | 212305863 | U | 1/2021 |

* cited by examiner

SIGNAL ENHANCEMENT APPARATUS FOR MOWER, AND MOWER

CROSS-REFERENCE TO RELATED PATENT APPLICATIONS

This application is a national stage of International Application No. PCT/CN2021/143799, filed on Dec. 31, 2021, which claims priority to CN patent application No. 202123271908.0, filed on Dec. 23, 2021. All of the aforementioned applications are hereby incorporated by reference in their entireties.

TECHNICAL FIELD

The disclosure relates to the field of lawn mowers, in particular to a signal enhancement apparatus for a lawn mower and a lawn mower.

BACKGROUND

A lawn mower operates within a pre-embedded boundary or a user drawn work area through GPS positioning. However, due to weak signal strength of an antenna used by the existing lawn mower, the lawn mower cannot operate along a predetermined route, resulting in inefficient random mowing.

SUMMARY

In view of the above problems, the disclosure aims to provide a signal enhancement apparatus for a lawn mower and a lawn mower including the signal enhancement apparatus for a lawn mower. The signal enhancement apparatus for a lawn mower includes a signal enhancement plate, and a reflection layer of the signal enhancement plate can reflect GPS signals to an antenna box, thereby amplifying the signal reception range and strength of the antenna box, enabling the lawn mower to operate along a predetermined route, and improving the mowing efficiency.

The disclosure provides a signal enhancement apparatus for a lawn mower, the signal enhancement apparatus for a lawn mower is mounted in a mounting base of the lawn mower, and the signal enhancement apparatus for a lawn mower includes an antenna box and a signal enhancement plate; the antenna box is arranged on the signal enhancement plate. The signal enhancement plate includes a dielectric layer and a reflection layer, the reflection layer is provided on at least one side of the dielectric layer, the area of the reflection layer is not less than the orthographic projection area of the antenna box on the signal enhancement plate, and the orthographic projection of the antenna box on the enhancement plate is included within the range of the reflection layer.

In a feasible implementation, the reflection layer is provided on both an upper surface and a lower surface of the dielectric layer, and the upper surface of the dielectric layer is a side connected to the antenna box.

In a feasible implementation, the reflection layer is a copper foil.

In a feasible implementation, the dielectric layer is a printed circuit board.

In a feasible implementation, a through hole is provided at an edge of the signal enhancement plate, and a feed line of the antenna box passes through the through hole.

In a feasible implementation, the signal enhancement plate includes a positioning hole.

In a feasible implementation, the signal enhancement plate includes two positioning holes, and the two positioning holes are located on two sides of the antenna box respectively.

In a feasible implementation, the signal enhancement plate is fixed to the antenna box by bonding.

Correspondingly, the disclosure further provides a lawn mower, including a mounting base and the aforementioned signal enhancement apparatus for a lawn mower, where the mounting base includes positioning columns and support plates, the positioning columns penetrate into the positioning holes of the signal enhancement apparatus for a lawn mower, and the support plates support the signal enhancement plate of the signal enhancement apparatus for a lawn mower.

In a feasible implementation method, the positioning columns correspond with the positioning holes one to one, and a support plate is correspondingly arranged next to each of the positioning columns.

The implementation of the disclosure has the following beneficial effects:

1. In the signal enhancement apparatus for a lawn mower provided by the disclosure, a signal enhancement plate is arranged on the lower surface of the antenna box, the area of the signal enhancement plate is greater than that of the antenna box, and the signal enhancement plate can reflect GPS signals to the antenna box, thereby increasing the signal reception range and increasing signal strength.
2. In the signal enhancement apparatus for a lawn mower provided by the disclosure, the signal enhancement plate is a copper-clad printed circuit board, which can be subsequently connected to a circuit to add other electronic functions.
3. The lawn mower provided by the disclosure includes the aforementioned signal enhancement apparatus for a lawn mower, so the signal enhancement effect is obvious.
4. When the lawn mower including the signal enhancement apparatus for a lawn mower provided by the disclosure is mounted, only the positioning columns of the lawn mower need to penetrate into the positioning holes of the signal enhancement apparatus for a lawn mower, so the structure is simple, the mounting is convenient, and the signal enhancement effect is obvious.

REFERENCE NUMERALS IN THE DRAWINGS

Figure 1:
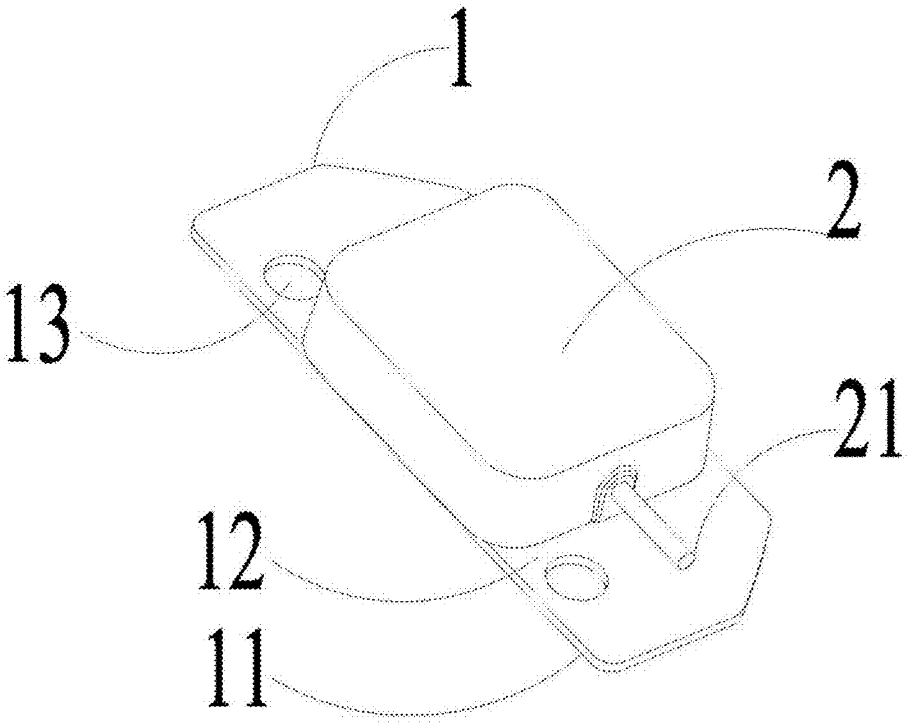
FIG. 1 is a schematic structural diagram of a signal enhancement apparatus for a lawn mower provided by the disclosure.

1—signal enhancement plate,
11—dielectric layer,
12—reflection layer,
13—positioning hole,
2—antenna box,
21—feed line,
3—mounting base,

31—positioning column, and

32—support plate.

DETAILED DESCRIPTION OF THE EMBODIMENTS

In order to make the above objectives, features, and advantages of the disclosure more obvious and understandable, specific implementations of the disclosure will be explained in detail below with reference to the accompanying drawings. Many specific details are elaborated in the following description to facilitate full understanding of the disclosure. However, the disclosure can be implemented in many other ways different from those described here, and those skilled in the art can make similar improvements without violating the connotation of the disclosure. Therefore, the disclosure is not limited by specific embodiments disclosed below.

It should be noted that when one element is referred to as being "fixed" to another element, the element may be directly located on the other element, or a medium element may exist. When one element is considered to be "connected" to another element, the element may be directly connected to the other element, or a medium element may exist simultaneously. The terms "vertical," "horizontal," "left," "right," and similar expressions used herein are only for the purpose of illustration.

Unless otherwise defined, all technical and scientific terms used herein have the same meanings as those commonly understood by those skilled in the technical field of the disclosure. The terms used in the description of the disclosure herein are only for the purpose of describing specific embodiments and are not intended to limit the disclosure. The term "and/or" used herein includes any and all combinations of one or more relevant listed items.

This embodiment provides a signal enhancement apparatus for a lawn mower. The signal enhancement apparatus for a lawn mower is mounted in a mounting base of the lawn mower. The signal enhancement apparatus includes an antenna box and a signal enhancement plate, and the antenna box is arranged on the signal enhancement plate. In other possible implementations, the antenna box may be in contact connection with the signal enhancement plate, including but not limited to bonding, or the antenna box may be suspended over the signal enhancement plate.

The signal enhancement plate includes a dielectric layer and a reflection layer, the reflection layer is provided on at least one side of the dielectric layer, the area of the reflection layer is not less than the orthographic projection area of the antenna box on the signal enhancement plate, and the orthographic projection of the antenna box on the enhancement plate is included within the range of the reflection layer. In a feasible implementation, the reflection layer is provided on both an upper surface and a lower surface of the dielectric layer, and the upper surface of the dielectric layer is a side connected to the antenna box.

In a possible implementation, the reflection layer is a metal sheet, including but not limited to copper or iron, for reflecting GPS signals. The reflection layer may have a symmetrical shape, including but not limited to circular, square, and cross shapes, which are conducive to uniform satellite search.

In a possible implementation, the reflection layer is a copper foil.

In a feasible implementation, the dielectric layer is a printed circuit board, which facilitates subsequent circuit connections to add other electronic functions. Specifically, circuits are connected to the lower surface of the dielectric layer covered with the copper foil.

In a feasible implementation, a through hole is provided at an edge of the signal enhancement plate, and a feed line of the antenna box passes through the through hole.

In a feasible implementation, the signal enhancement plate includes two positioning holes, and the two positioning holes are located on two sides of the antenna box respectively to limit the signal enhancement plate.

Correspondingly, the disclosure further provides a lawn mower, including a mounting base and the aforementioned signal enhancement apparatus for a lawn mower. The mounting base includes positioning columns and support plates, the positioning columns penetrate into the positioning holes of the signal enhancement apparatus for a lawn mower, and the support plates support the signal enhancement plate of the signal enhancement apparatus for a lawn mower.

In a feasible implementation method, the positioning columns correspond with the positioning holes one to one, and a support plate is correspondingly arranged next to each of the positioning columns.

The following provides a specific explanation of the disclosure in conjunction with a specific embodiment. As shown in FIG. 1, this specific embodiment provides a signal enhancement apparatus for a lawn mower. The signal enhancement apparatus for a lawn mower is mounted in a mounting base 3 of the lawn mower. The signal enhancement apparatus for a lawn mower includes an antenna box 2 and a signal enhancement plate 1, and the antenna box 2 is arranged on the signal enhancement plate 1. In this embodiment, the antenna box 2 is fixed to the signal enhancement plate 1 by bonding.

The antenna box 2 includes an antenna (not shown), the antenna is arranged at a middle part of the antenna box 2, and a clear zone is provided between the antenna and the antenna box 2 to reduce the interference of the lawn mower with GPS signals.

The signal enhancement plate 1 includes a dielectric layer 11 and a reflection layer 12. In this embodiment, the dielectric layer 11 of the signal enhancement plate 1 is a printed circuit board, and the reflection layer 12 is a copper foil.

The reflection layer 12 covers an upper surface and a lower surface of the dielectric layer 11, and the upper surface, covered with the reflection layer 12, of the dielectric layer 11 is connected to the antenna box 2. The reflection layer 12 on the upper surface can reflect GPS signals to the antenna, thereby increasing the GPS signal reception range of the antenna and increasing GPS signal strength. The reflection layer 12 on the lower surface has some shielding effect on interference, and in other possible implementation methods, the reflection layer may be connected to a circuit to add other electronic functions.

A through hole is provided at an edge of the signal enhancement plate 1, and a feed line 21 extends from the antenna box 2, passes through the through hole, and is connected to the circuit. The signal enhancement plate 1 further includes two positioning holes 13 arranged symmetrically, and the two positioning holes 13 can cooperate with positioning columns 31 on the mounting base 3 of the lawn mower to limit the signal enhancement plate 1.

Figure 2:
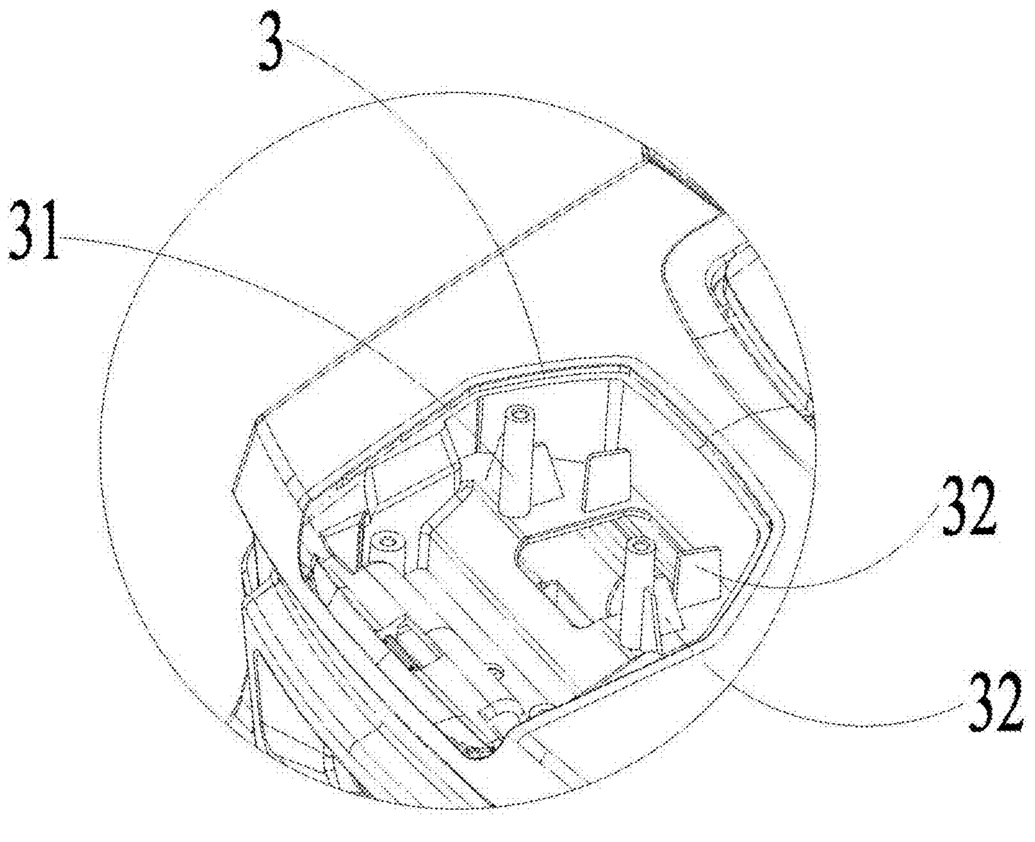
FIG. 2 is a schematic structural diagram of a mounting base of a lawn mower provided by the disclosure.
Figure 3:
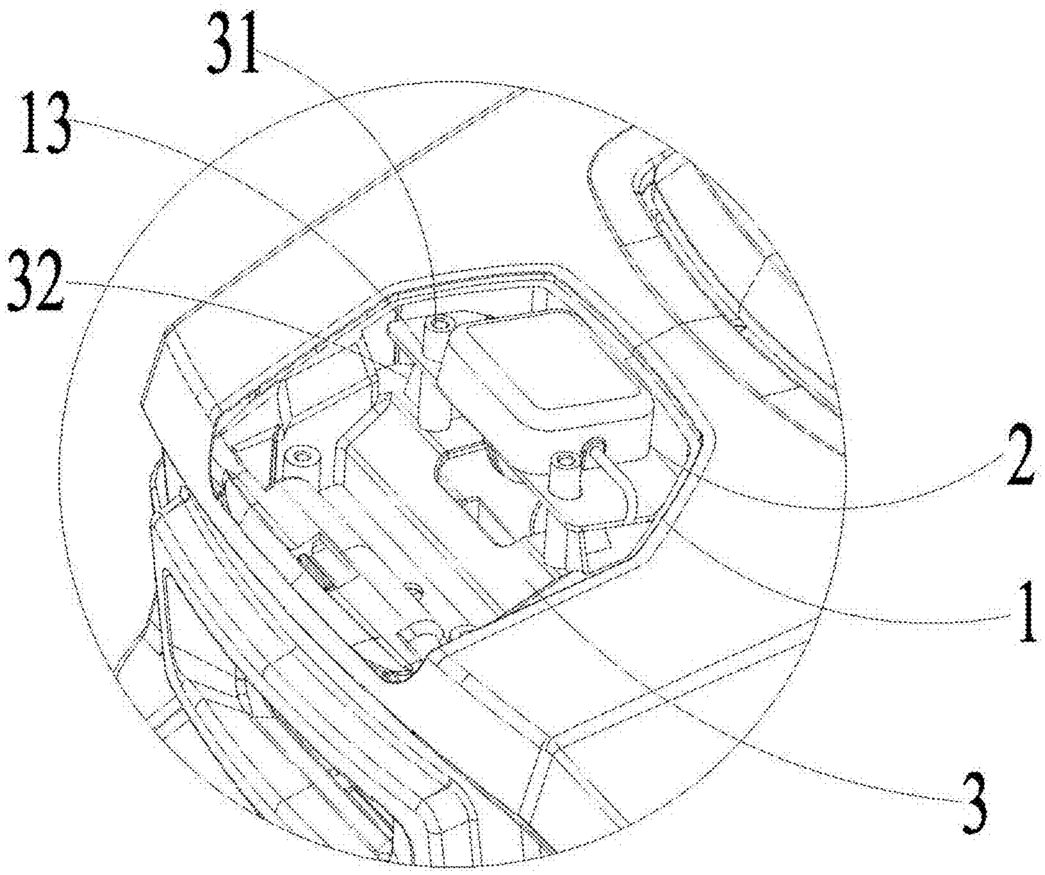
FIG. 3 is a schematic diagram showing that the signal enhancement apparatus for a lawn mower provided by the disclosure cooperates with the mounting base.

With reference to FIG. 2 and FIG. 3, this specific embodiment further provides a lawn mower including the aforementioned signal enhancement apparatus for a lawn mower, including a mounting base 3 and the aforementioned signal enhancement apparatus for a lawn mower. The mounting base 3 includes positioning columns 31 and support plates 32, the positioning columns 31 penetrate into the positioning holes 13 of the signal enhancement apparatus for a lawn mower, and the support plates 32 support the signal enhancement plate 1 of the signal enhancement apparatus for a lawn mower.

In this embodiment, a support plate 32 is provided next to each positioning column 31, and two support plates 32 at an angle are further connected to a periphery of each positioning column 31, making the mounting of the signal enhancement apparatus for a lawn mower more stable.

In this embodiment, the boundary shape of the mounting base 3 cooperates with the shape of the signal enhancement apparatus to further clamp the signal enhancement apparatus onto the lawn mower.

In the signal enhancement apparatus for a lawn mower provided by the disclosure, a signal enhancement plate is arranged on the lower surface of the antenna box, the area of the signal enhancement plate is greater than that of the antenna box, and the signal enhancement plate can reflect GPS signals to the antenna box, thereby increasing the signal reception range and increasing signal strength; and the signal enhancement plate is a copper-clad printed circuit board, which can be subsequently connected to a circuit to add other electronic functions.

The lawn mower provided by the disclosure includes the signal enhancement apparatus for a lawn mower, which can significantly increase the signal reception strength of the antenna box; and during mounting, only the positioning columns of the lawn mower need to penetrate into the positioning holes of the signal enhancement apparatus for a lawn mower, so the structure is simple and the mounting is convenient.

The technical features of the above embodiments may be combined arbitrarily. For the purpose of simplicity in description, all possible combinations of the technical features in the above embodiments are not described. However, as long as the combinations of these technical features do not have contradictions, they shall fall within the scope of the description.

The above embodiments only express several implementations of the disclosure, and their description is more specific and detailed, but cannot be understood as a limitation on the scope of the disclosure patent. Notably, for those of ordinary skill in the art, many modifications and improvements can be made without departing from the concept of the disclosure, all of which fall within the scope of protection of the disclosure. Therefore, the scope of protection of the disclosure patent should be subject to the appended claims.

The invention claimed is:

1. A signal enhancement apparatus for a lawn mower configured to be mounted in a mounting base of the lawn mower, the signal enhancement apparatus for the lawn mower comprising:

an antenna box; and a signal enhancement plate configured for attachment to the mounting base, the antenna box being arranged on the signal enhancement plate, wherein the signal enhancement plate includes a dielectric layer and a reflection layer, the reflection layer is provided on at least one side of the dielectric layer, an area of the reflection layer is not less than an orthographic projection area of the antenna box on the signal enhancement plate, and the orthographic projection area of the antenna box on the enhancement plate is configured to be within the area of the reflection layer, wherein a through hole is defined at an edge of the signal enhancement plate, and a feed line of the antenna box passes through the through hole.

2. The signal enhancement apparatus for a lawn mower according to claim 1, wherein the reflection layer is provided on both an upper surface and a lower surface of the dielectric layer, and the upper surface of the dielectric layer is a side connected to the antenna box.

3. The signal enhancement apparatus for a lawn mower according to claim 1, wherein the reflection layer is a copper foil.

4. The signal enhancement apparatus for a lawn mower according to claim 1, wherein the dielectric layer is a printed circuit board.

5. The signal enhancement apparatus for a lawn mower according to claim 1, wherein the signal enhancement plate defines a positioning hole.

6. The signal enhancement apparatus for a lawn mower according to claim 5, wherein the signal enhancement plate defines two of the positioning holes, and the two positioning holes are located on two sides of the antenna box respectively.

7. A lawn mower comprising a mounting base and the signal enhancement apparatus for a lawn mower according to claim 6, wherein the mounting base includes positioning columns and support plates, the positioning columns penetrate into the positioning holes of the signal enhancement plate, and the support plates support the signal enhancement plate.

8. The lawn mower according to claim 7, wherein the positioning columns correspond with the positioning holes one to one, and one of the support plates is correspondingly arranged next to a respective one of the positioning columns.

9. The signal enhancement apparatus for a lawn mower according to claim 1, wherein the signal enhancement plate is fixed to the antenna box by bonding.

10. A signal enhancement apparatus for a lawn mower configured to be mounted in a mounting base of the lawn mower, the signal enhancement apparatus for the lawn mower comprising:

an antenna box; and a signal enhancement plate configured for attachment to the mounting base, the antenna box being arranged on the signal enhancement plate, wherein the signal enhancement plate includes a dielectric layer and a reflection layer, the reflection layer is provided on at least one side of the dielectric layer, an area of the reflection layer is not less than an orthographic projection area of the antenna box on the signal enhancement plate, and the orthographic projection area of the antenna box on the enhancement plate is configured to be within the area of the reflection layer, wherein the signal enhancement plate defines two positioning holes, and the two positioning holes are located on two sides of the antenna box respectively, wherein the mounting base includes positioning columns and support plates, the positioning columns penetrate into the positioning holes of the signal enhancement plate, and the support plates support the signal enhancement plate.

11. The signal enhancement apparatus for a lawn mower according to claim 10, wherein the reflection layer is provided on both an upper surface and a lower surface of the dielectric layer, and the upper surface of the dielectric layer is a side connected to the antenna box.

12. The signal enhancement apparatus for a lawn mower according to claim 10, wherein the reflection layer is a copper foil.

13. The signal enhancement apparatus for a lawn mower according to claim 10, wherein the dielectric layer is a printed circuit board.

14. The signal enhancement apparatus for a lawn mower according to claim 10, wherein a through hole is provided at an edge of the signal enhancement plate, and a feed line of the antenna box passes through the through hole.

15. The signal enhancement apparatus for a lawn mower according to claim 10, wherein the signal enhancement plate is fixed to the antenna box by bonding.

16. The lawn mower according to claim 10, wherein the positioning columns correspond with the positioning holes one to one, and one of the support plates is correspondingly arranged next to a respective one of the positioning columns.

* * * * *